US012735515B2

(12) United States Patent
Jo et al.

(10) Patent No.: US 12,735,515 B2
(45) Date of Patent: Sep. 15, 2026

(54) OLEFINIC POLYMER, AND METHOD FOR PREPARING SAME

(71) Applicant: HANWHA SOLUTIONS CORPORATION, Seoul (KR)

(72) Inventors: Jisong Jo, Daejeon (KR); Jeong Hyun Park, Daejeon (KR); Sung Dong Kim, Daejeon (KR); Munhee Lee, Daejeon (KR); Ui Gap Joung, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 602 days.

(21) Appl. No.: 18/265,861

(22) PCT Filed: Dec. 2, 2021

(86) PCT No.: PCT/KR2021/018071
§ 371 (c)(1),
(2) Date: Jun. 7, 2023

(87) PCT Pub. No.: WO2022/124692
PCT Pub. Date: Jun. 16, 2022

(65) Prior Publication Data

US 2024/0043588 A1 Feb. 8, 2024

(30) Foreign Application Priority Data

Dec. 8, 2020 (KR) ........................ 10-2020-0170283

(51) Int. Cl.
*C08F 210/02* (2006.01)
*C08F 4/659* (2006.01)
*C08F 4/6592* (2006.01)

(52) U.S. Cl.
CPC ........ *C08F 210/02* (2013.01); *C08F 4/65916* (2013.01); *C08F 4/65922* (2013.01)

(58) Field of Classification Search
CPC .................................................... C08F 210/02
See application file for complete search history.

(56) References Cited

U.S. PATENT DOCUMENTS 6,225,411 B1 * 5/2001 Dang ...................... C08L 23/12 525/201
6,828,394 B2 * 12/2004 Vaughan ................ C08F 10/00 526/113
2002/0119890 A1 8/2002 Wenzel et al.
2005/0159300 A1 7/2005 Jensen et al.
2012/0065346 A1 * 3/2012 Nozue ..................... C08F 10/00 502/118
2014/0094582 A1 * 4/2014 Nomura ................ C08F 210/16 526/348.5
2016/0362510 A1 12/2016 Rix et al.
2018/0327524 A1 11/2018 Lue et al.
2019/0136021 A1 * 5/2019 Kobayashi ............ C08F 210/02
2019/0144575 A1 * 5/2019 Lue ....................... C08F 210/16 526/348.4
2019/0169323 A1 * 6/2019 Lee ....................... C08F 210/02
2020/0190238 A1 * 6/2020 Lee ......................... C07F 17/00
2021/0347920 A1 * 11/2021 Seo ..................... C08F 4/65904
2023/0312773 A1 * 10/2023 Park .................... C08F 4/65916 526/129
2023/0416426 A1 * 12/2023 Joung ....................... C08F 4/76
2023/0416427 A1 * 12/2023 Lee ........................... C08F 4/76
2024/0059815 A1 * 2/2024 Kim ...................... C08F 210/16
2024/0059816 A1 * 2/2024 Kim .................... C08F 4/65912
2024/0084057 A1 * 3/2024 Jo ......................... C08F 210/16
2024/0132639 A1 * 4/2024 Jo ........................... C08F 10/14
2024/0150606 A1 * 5/2024 Mukai ....................... C08F 8/44
2025/0019474 A1 * 1/2025 Kim .................... C08F 4/65916
2025/0034299 A1 * 1/2025 Lee ....................... C08F 210/16
2025/0043038 A1 * 2/2025 Park .................... C08F 4/65925

FOREIGN PATENT DOCUMENTS

JP 2003-96125 A 4/2003
JP 2007-518871 A 7/2007
JP 2015-113282 A 6/2015
JP 2017-505370 A 2/2017
JP 2020-117678 A 8/2020
KR 10-2020-0075963 A 6/2020
KR 10-2020-0117663 A 10/2020
WO WO-2019013595 A1 * 1/2019 ........... C08F 4/6545

(Continued)

OTHER PUBLICATIONS

Extended European Search Report dated Oct. 10, 2024, issued in European Application No. 201903738.9.

(Continued)

*Primary Examiner* — Liam J Heincer
(74) *Attorney, Agent, or Firm* — Sughrue Mion, PLLC

(57) ABSTRACT

An olefinic polymer and a method for preparing the olefinic polymer are disclosed. The olefinic polymer has excellent melt strength, and thus has excellent bubble stability during blown film molding. The olefinic polymer has (1) a density of 0.9 to 0.95 g/cm$^3$; (2) a melt index ($I_{2.16}$) of 0.1 to 5.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) a melt tension of 55 mN or more at a velocity at break of 350 mm/s; and (5) a maximum velocity at break of 550 mm/s or more.

9 Claims, 1 Drawing Sheet

(56) References Cited

FOREIGN PATENT DOCUMENTS

| | | | | |
|---|---|---|---|---|
| WO | 2019/027585 | A1 | 2/2019 | |
| WO | WO-2020204480 | A1 * | 10/2020 | .............. C08F 10/00 |
| WO | 2022/108233 | A1 | 5/2022 | |
| WO | 2022/108252 | A1 | 5/2022 | |

OTHER PUBLICATIONS

International Search Report for PCT/KR2021/018071, dated Mar. 28, 2022.

Korea Patent Office, Written Decision on Registration issued Feb. 1, 2024 in Application No. 10-2021-0170514.

* cited by examiner

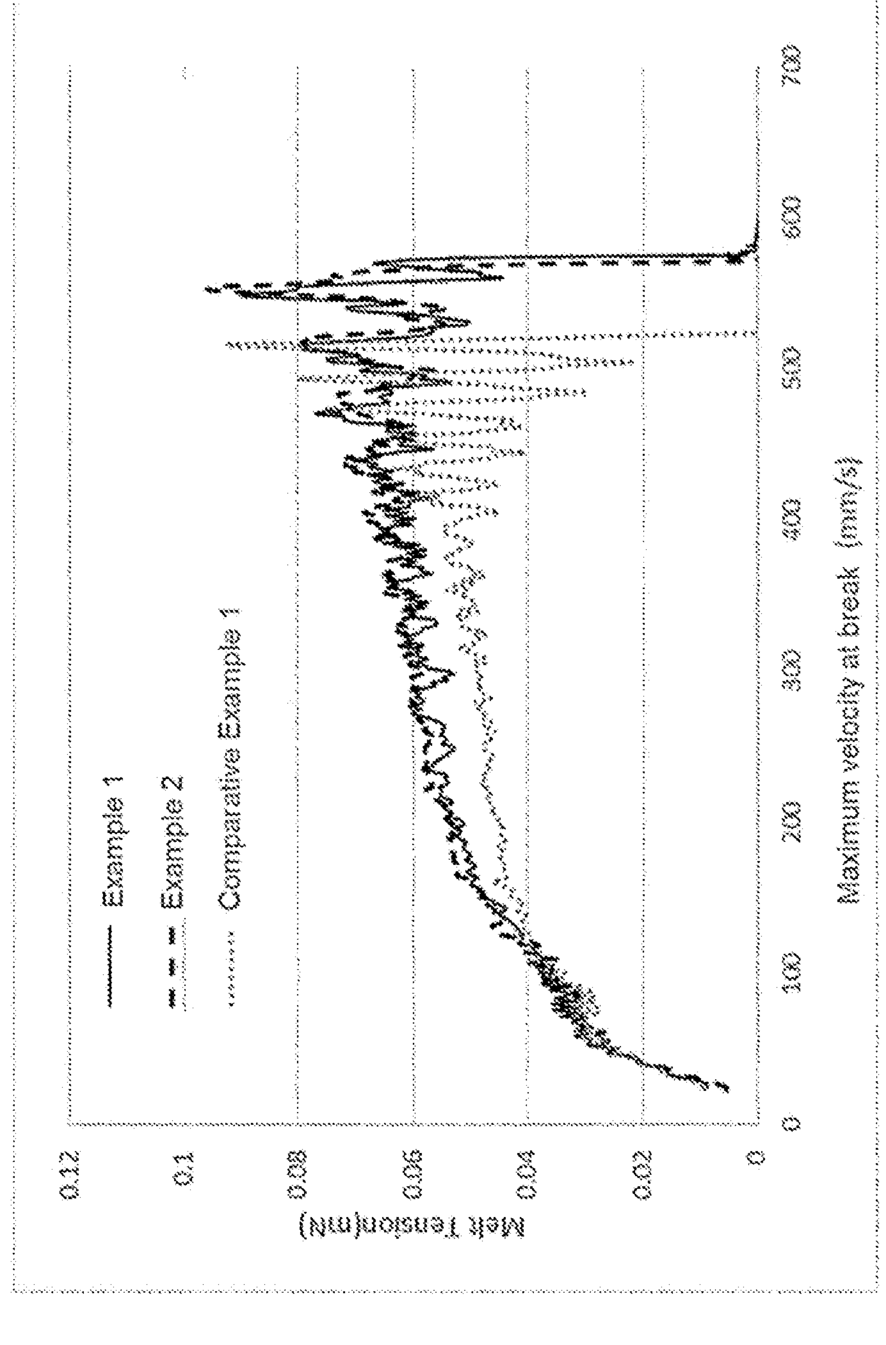
Example 1
Example 2
Comparative Example 1
Melt Tension(mN)
0.12
0.1
0.08
0.06
0.04
0.02
0
0
100
200
300
400
500
600
700
Maximum velocity at break (mm/s)

OLEFINIC POLYMER, AND METHOD FOR PREPARING SAME

CROSS REFERENCE TO RELATED APPLICATIONS

This application is a National Stage of International Application No. PCT/KR2021/018071 filed Dec. 2, 2021, claiming priority based on Korean Patent Application No. 10-2020-0170283 filed Dec. 8, 2020.

TECHNICAL FIELD

The present invention relates to an olefinic polymer and a method for preparing the same. Specifically, the present invention relates to an olefinic polymer having excellent melt strength and a method for preparing the same.

BACKGROUND ART

A metallocene catalyst which is one of the catalysts used in olefin polymerization, which is a compound in which a ligand such as cyclopentadienyl, indenyl, or cycloheptadienyl is coordinated to a transition metal or a transition metal halogen compound, has a sandwich structure as a basic form.

A Ziegler-Natta catalyst which is another catalyst used for polymerizing olefins has heterogeneous properties of an active site, since a metal component as an active site is dispersed on an inert solid surface; however, the metallocene catalyst is known as a single-site catalyst having identical polymerization properties in all active sites, since it is one compound having a certain structure. A polymer polymerized with the metallocene catalyst as such has a narrow molecular weight distribution, a uniform comonomer distribution, and copolymerization activity higher than the Ziegler Natta catalyst.

Meanwhile, a linear low-density polyethylene (LLDPE) is prepared by copolymerizing ethylene and α-olefin at a low pressure using a polymerization catalyst, has a narrow molecular weight distribution and a short chain branch (SCB) having a certain length, and does not have a long chain branch (LCB) in general. A film prepared with a linear low-density polyethylene has high breaking strength and elongation, and excellent tear strength, impact strength, and the like, together with general properties of polyethylene, and thus, is widely used in a stretch film, an overlap film, and the like to which it is conventionally difficult to apply low-density polyethylene or high-density polyethylene.

However, in order to mold an olefinic polymer prepared by a metallocene catalyst into a blown film, excellent melt strength is required.

DISCLOSURE

Technical Problem

An object of the present invention is to provide an olefinic polymer having excellent melt strength.

Another object of the present invention is to provide a method for preparing the olefinic polymer.

Technical Solution

In one general aspect, an olefinic polymer which has (1) a density of 0.9 to 0.95 g/cm$^3$; (2) a melt index ($I_{2.16}$) of 0.1 to 5.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) a melt tension of 55 mN or more at a velocity at break of 350 mm/s; and (5) a maximum velocity at break of 550 mm/s or more is provided.

In a specific exemplary embodiment, the olefinic polymer may have (1) the density of 0.915 to 0.945 g/cm$^3$; (2) the melt index ($I_{2.16}$) of 0.1 to 5.0 g/10 min as measured with a load of 2.16 kg at 190° C.; (3) the ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) the melt tension of 60 mN or more at a velocity at break of 350 mm/s; and (5) the maximum velocity at break of 570 mm/s or more.

In a preferred specific example of the present invention, the olefinic polymer may have (1) the density of the olefinic polymer of 0.915 to 0.942 g/cm$^3$; (2) the melt index ($I_{2.16}$) of 0.5 to 3.5 g/10 min as measured with a load of 2.16 kg at 190° C.; (3) the MFR of 20 to 50; (4) the melt tension of 60 to 100 mN at a velocity at break of 350 mm/s; and (5) the maximum velocity at break of 570 to 800 mm/s.

In a specific example of the present invention, the olefinic polymer may be prepared by polymerizing an olefinic monomer in the presence of a hybrid catalyst including: at least one first transition metal compound represented by the following Chemical Formula 1; and at least one second transition metal compound selected from a compound represented by the following Chemical Formula 2 and a compound represented by the following Chemical Formula 3:

[Chemical Formula 1]

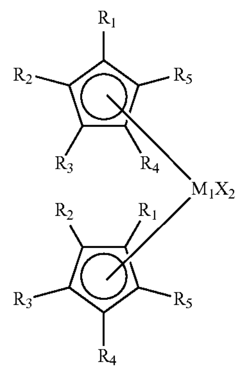

[Chemical Formula 2]

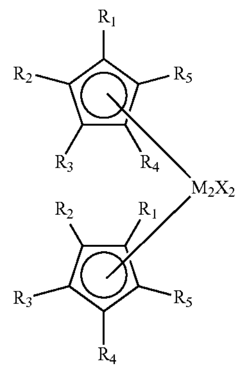

-continued

[Chemical Formula 3]

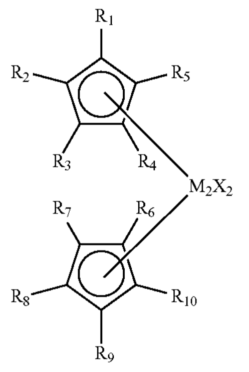

wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, or $C_{1-20}$ alkylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provide that $R^1$ to $R^{10}$ may be independently of each other connected to an adjacent group to form a substituted or unsubstituted saturated or unsaturated $C_{4-20}$ ring.

In a specific example of the present invention, $M_1$ and $M_2$ may be different from each other and be zirconium or hafnium, respectively, X may be halogen or $C_{1-20}$ alkyl, respectively, and $R_1$ to $R_{10}$ may be hydrogen, substituted or unsubstituted $C_{1-20}$ alkyl, substituted or unsubstituted $C_{1-20}$ alkenyl, or substituted or unsubstituted $C_{6-20}$ aryl, respectively.

In a preferred specific example of the present invention, $M_1$ may be hafnium, $M_2$ may be zirconium, and X may be chlorine or methyl.

In a preferred specific example of the present invention, the first transition metal compound may be at least one of transition metal compounds represented by the following Chemical Formulae 1-1 and 1-2, and the second transition metal compound may be at least one of transition metal compounds represented by the following Chemical Formulae 2-1, 2-2, and 3-1:

[Chemical Formula 1-1]

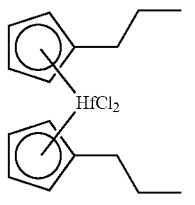

-continued

[Chemical Formula 1-2]

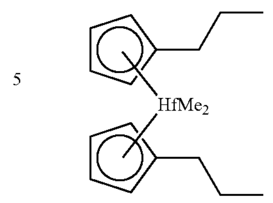

[Chemical Formula 2-1]

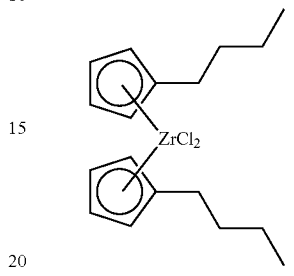

[Chemical Formula 2-2]

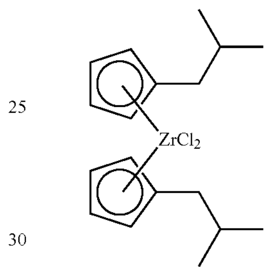

[Chemical Formula 3-1]

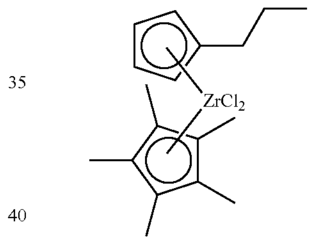

wherein Me is a methyl group.

In a specific example of the present invention, a mole ratio of the first transition metal compound to the second transition metal compound is in a range of 100:1 to 1:100.

In a specific example of the present invention, the catalyst may include at least one cocatalyst selected from the group consisting of a compound represented by the following Chemical Formula 4, a compound represented by the following Chemical Formula 5, and a compound represented by the following Chemical Formula 6:

[Chemical Formula 4]

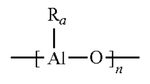

[Chemical Formula 5]

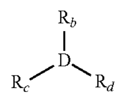

[Chemical Formula 6]

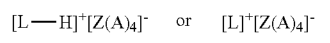

wherein n is an integer of 2 or more, $R_a$ is a halogen atom, a $C_{1-20}$ hydrocarbon group, or a $C_{1-20}$ hydrocarbon group substituted with halogen, D is aluminum (Al) or boron (B), and $R_b$, $R_c$, and $R_d$ are independently of one another a halogen atom, a $C_{1-20}$ hydrocarbon group, a $C_{1-20}$ hydrocarbon group substituted with halogen, or a $C_{1-20}$ alkoxy group, and L is a neutral or cationic Lewis base, $[L-H]^+$ and $[L]^+$ are a Bronsted acid, Z is a group 13 element, and A is independently of each other a substituted or unsubstituted $C_{6-20}$ aryl group or a substituted or unsubstituted $C_{1-20}$ alkyl group.

In a specific example of the present invention, the catalyst may further include a carrier which supports a transition metal compound, a cocatalyst compound, or both of them.

In a preferred specific example of the present invention, the carrier may include at least one selected from the group consisting of silica, alumina, and magnesia.

Here, a total amount of the hybrid transition metal compound supported on the carrier may be 0.001 to 1 mmole based on 1 g of the carrier, and a total amount of the cocatalyst compound supported on the carrier may be 2 to 15 mmole based on 1 g of the carrier.

In a specific example of the present invention, the olefinic polymer may be a copolymer of an olefinic monomer and an olefinic comonomer. Specifically, the olefinic monomer may be ethylene, and the olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene. Preferably, the olefinic polymer may be a linear low-density polyethylene in which the olefinic monomer is ethylene and the olefinic comonomer is 1-hexene.

In another general aspect, a method for preparing an olefinic polymer includes: polymerizing an olefinic monomer in the presence of a hybrid catalyst including: at least one first transition metal compound represented by Chemical Formula 1; and at least one second transition metal compound selected from the compound represented by Chemical Formula 2 and the compound represented by Chemical Formula 3, thereby obtaining an olefinic polymer, wherein the olefinic polymer has (1) a density of 0.9 to 0.95 $g/cm^3$; (2) a melt index ($I_{2.16}$) of 0.5 to 1.5 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) a melt tension of 55 mN or more at a velocity at break of 350 mm/s; and (5) a maximum velocity at break of 550 mm/s or more.

In a specific example of the present invention, polymerization of the olefinic monomer may be performed by gas phase polymerization, and specifically, the polymerization of the olefinic monomer may be performed in a gas phase fluidized bed reactor.

Advantageous Effects

The olefinic polymer according to an exemplary embodiment of the present invention has excellent melt strength and excellent bubble stability during blown film molding.

DESCRIPTION OF DRAWINGS

The FIGURE is a graph showing melt strength versus a maximum velocity at break of olefinic polymers of Examples 1 and 2 and Comparative Example 1.

BEST MODE

Hereinafter, the present invention will be described in more detail.

Olefinic Polymer

According to an exemplary embodiment of the present invention, an olefinic polymer which has (1) a density of 0.9 to 0.95 $g/cm^3$; (2) a melt index ($I_{2.16}$) of 0.1 to 5.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) a melt tension of 55 mN or more at a velocity at break of 350 mm/s; and (5) a maximum velocity at break of 550 mm/s or more is provided.

In a specific exemplary embodiment, the olefinic polymer may have (1) the density of 0.915 to 0.945 $g/cm^3$; (2) the melt index ($I_{2.16}$) of 0.1 to 5.0 g/10 min as measured with a load of 2.16 kg at 190° C.; (3) the ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) the melt tension of 60 mN or more at a velocity at break of 350 mm/s; and (5) the maximum velocity at break of 570 mm/s or more.

In a preferred specific example of the present invention, the olefinic polymer may have (1) the density of the olefinic polymer of 0.915 to 0.942 $g/cm^3$; (2) the melt index ($I_{2.16}$) of 0.5 to 3.5 g/10 min as measured with a load of 2.16 kg at 190° C.; (3) the MFR of 20 to 50; (4) the melt tension of 60 to 100 mN at a velocity at break of 350 mm/s; and (5) the maximum velocity at break of 570 to 800 mm/s.

In a specific example of the present invention, the olefinic polymer has the density of 0.9 to 0.95 $g/cm^3$. Preferably, the olefinic polymer may have the density of 0.91 to 0.945 $g/cm^3$, 0.915 to 0.945 $g/cm^3$, 0.91 to 0.93 $g/cm^3$, 0.915 to 0.942 $g/cm^3$, or 0.915 to 0.925 $g/cm^3$.

In a specific example of the present invention, the olefinic polymer may have the melt index ($I_{2.16}$) of 0.1 to 5.0 g/10 min as measured with a load of 2.16 kg at 190° C. Preferably, the melt index of the olefinic polymer measured with a load of 2.16 kg at 190° C. may be 0.3 to 4.0 g/10 min, 0.5 to 3.5 g/10 min, or 0.5 to 3.0 g/10 min.

In a specific example of the present invention, the olefinic polymer may have the ratio between a melt index ($I_{21.6}$) measured with a load of 21.6 kg and a melt index ($I_{2.16}$) measured with a load of 2.16 kg at 190° C. (melt flow ratio; MFR) of 20 or more. Preferably, the olefinic polymer may have the MFR of 22 or more or 20 to 50.

In a specific example of the present invention, the olefinic polymer may have the melt tension of 55 mN or more at a velocity at break of 350 mm/s. Preferably, the olefinic polymer may have the melt tension of 60 mN or more or 60 to 100 mN at a velocity at break of 350 mm/s. The melt tension is a measure showing the melt strength of an olefinic polymer, and as the melt tension is higher, bubble stability, which is a characteristic to allow a film to maintain its shape without shaking during manufacture of a blown film with an olefinic polymer, is excellent.

In a specific example of the present invention, the olefinic polymer may have the maximum velocity at break of 550 mm/s or more. Preferably, the olefinic polymer may have the maximum velocity at break of 570 mm/s or more or 570 to 800 mm/s. Since a film extrusion processing linear velocity is increased with a higher maximum velocity at break, film productivity may be increased.

The olefinic polymer according to an exemplary embodiment of the present invention may be prepared by polymerizing an olefinic monomer in the presence of a hybrid catalyst including: at least one first transition compound represented by the following Chemical Formula 1; and at least one second transition metal compound selected from a compound represented by the following Chemical Formula 2 and a compound represented by Chemical Formula 3:

[Chemical Formula 1]

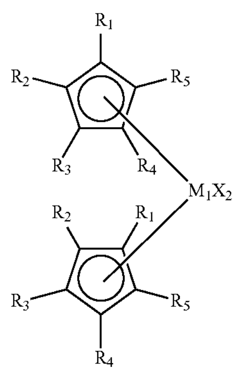

[Chemical Formula 2]

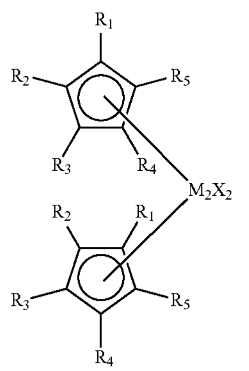

[Chemical Formula 3]

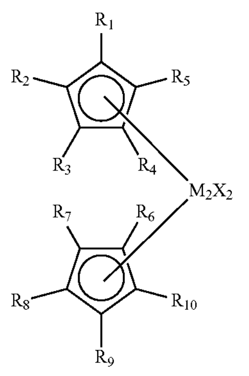

wherein $M_1$ and $M_2$ are different from each other and independently of each other titanium (Ti), zirconium (Zr), or hafnium (Hf). Specifically, $M_1$ and $M_2$ may be different from each other and be zirconium or hafnium, respectively. Preferably, $M_1$ may be hafnium and $M_2$ may be zirconium.

X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido. Specifically, X may be halogen or $C_{1-20}$ alkyl, respectively. Preferably, X may be chlorine or methyl.

$R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that in which $R_1$ to $R_{10}$ may be independently of each other connected to an adjacent group to form a substituted or unsubstituted saturated or unsaturated $C_{4-20}$ ring. Specifically, $R_1$ to $R_{10}$ may be hydrogen, substituted or unsubstituted $C_{1-20}$ alkyl, substituted or unsubstituted $C_{1-20}$ alkenyl, or substituted or unsubstituted $C_{6-20}$ aryl, respectively.

In a specific example of the present invention, $M_1$ and $M_2$ may be different from each other and be zirconium or hafnium, respectively, X may be halogen or $C_{1-20}$ alkyl, respectively, and $R_1$ to $R_{10}$ may be hydrogen, substituted or unsubstituted $C_{1-20}$ alkyl, substituted or unsubstituted $C_{1-20}$ alkenyl, or substituted or unsubstituted $C_{6-20}$ aryl, respectively.

In a preferred specific example of the present invention, $M_1$ may be hafnium, $M_2$ may be zirconium, and X may be chlorine or methyl.

In a preferred specific example of the present invention, the first transition metal compound may be at least one of transition metal compounds represented by the following Chemical Formulae 1-1 and 1-2, and the second transition metal compound may be at least one of transition metal compounds represented by the following Chemical Formulae 2-1, 2-2, and 3-1:

[Chemical Formula 1-1]

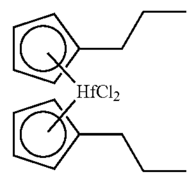

[Chemical Formula 1-2]

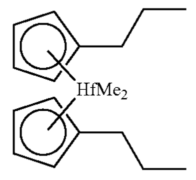

[Chemical Formula 2-1]

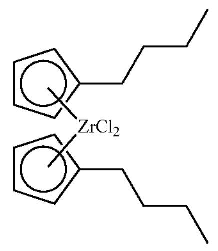

-continued

[Chemical Formula 2-2]

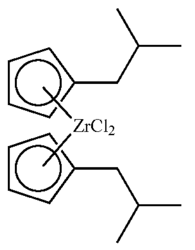

[Chemical Formula 3-1]

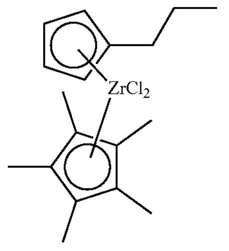

wherein Me is a methyl group.

In a specific example of the present invention, a mole ratio of the first transition metal compound to the second transition metal compound is in a range of 100:1 to 1:100. Preferably, a mole ratio of the first transition metal compound to the second transition metal compound is in a range of 50:1 to 1:50. Preferably, a mole ratio of the first transition metal compound to the second transition metal compound is in a range of 10:1 to 1:10.

In a specific example of the present invention, the catalyst may include at least one cocatalyst compound selected from the group consisting of a compound represented by the following Chemical Formula 4, a compound represented by the following Chemical Formula 5, and a compound represented by Chemical Formula 6:

[Chemical Formula 4]

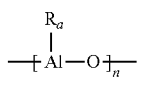

wherein n is an integer of 2 or more, $R_a$ is a halogen atom, $C_{1-20}$ hydrocarbon, or $C_{1-20}$ hydrocarbon substituted with halogen, and specifically, $R_a$ may be methyl, ethyl, n-butyl, or isobutyl,

[Chemical Formula 5]

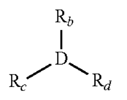

wherein D is aluminum (Al) or boron (B), and $R_b$, $R_c$, and $R_d$ are independently of one another a halogen atom, a $C_{1-20}$ hydrocarbon group, a $C_{1-20}$ hydrocarbon group substituted with halogen, or a $C_{1-20}$ alkoxy group, and specifically, when D is aluminum (Al), $R_b$, $R_c$, and $R_d$ may be independently of one another methyl or isobutyl, and when D is boron (B), $R_b$, $R_c$, and $R_d$ may be pentafluorophenyl, respectively,

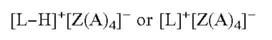

$[L-H]^+[Z(A)_4]^-$ or $[L]^+[Z(A)_4]^-$ [Chemical Formula 6]

wherein L is a neutral or cationic Lewis base, $[L-H]^+$ and $[L]^+$ are a Bronsted acid, Z is a group 13 element, and A is independently of each other a substituted or unsubstituted $C_{6-20}$ aryl group or a substituted or unsubstituted $C_{1-20}$ alkyl group, and specifically, $[L-H]^+$ may be a dimethylanilinium cation, $[Z(A)_4]^-$ may be $[B(C_6F_5)_4]^-$, and $[L]^+$ may be $[(C_6H_5)_3C]^+$.

Specifically, an example of the compound represented by Chemical Formula 4 includes methylaluminoxane, ethylaluminoxane, isobutylaluminoxane, butylaluminoxane, and the like, and is preferably methylaluminoxane, but is not limited thereto.

An example of the compound represented by Chemical Formula 5 includes trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and is preferably trimethylaluminum, triethylaluminum, and triisobutylaluminum, but is not limited thereto.

An example of the compound represented by Chemical Formula 6 includes triethylammoniumtetraphenylboron, tributylammoniumtetraphenylboron, trimethylammoniumtetraphenylboron, tripropylammoniumtetraphenylboron, trimethylammoniumtetra(p-tolyl) boron, trimethylammoniumtetra(o,p-dimethylphenyl)boron, tributylammoniumtetra (p-trifluoromethylphenyl)boron, trimethylammoniumtetra (p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, tributylammoniumtetra(p-trifluoromethylphenyl) boron, triphenylcarboniumtetra(p-trifluoromethylphenyl) boron, triphenylcarboniumtetrapentafluorophenylboron, and the like.

In a specific example of the present invention, the catalyst may further include a carrier which supports a transition metal compound, a cocatalyst compound, or both of them. Specifically, the carrier may support both the transition metal compound and the cocatalyst compound.

Here, the carrier may include a material containing a hydroxyl group on the surface, and preferably, may use a material having highly reactive hydroxyl group and siloxane group which is dried to remove moisture from the surface. For example, the carrier may include at least one selected from the group consisting of silica, alumina, and magnesia. Specifically, silica, silica-alumina, silica-magnesia, and the like which are dried at a high temperature may be used as the carrier, and these may usually contain oxide, carbonate, sulfate, and nitrate components such as $Na_2O$, $K_2CO_3$, $BaSO_4$, and $Mg(NO_3)_2$. In addition, these may include carbon, zeolite, magnesium chloride, and the like. However, the carrier is not limited thereto, and is not particularly limited as long as it may support a transition metal compound and a cocatalyst compound.

The carrier may have an average particle size of 10 to 250 μm, preferably 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, and more preferably 200 to 600 $m^2/g$.

In a preferred specific example of the present invention, the carrier may be silica. Here, a drying temperature of the silica may be 200 to 900° C. The drying temperature may be 300 to 800° C., and more preferably 400 to 700° C. When the drying temperature is lower than 200° C., silica has too much moisture so that the moisture on the surface reacts with the cocatalyst compound, and when the drying temperature is higher than 900° C., the structure of the carrier may collapse.

A concentration of a hydroxyl group in dried silica may be 0.1 to 5 mmol/g, preferably 0.7 to 4 mmol/g, and more preferably 1.0 to 2 mmol/g. When the concentration of the hydroxyl group is less than 0.1 mmol/g, the supported amount of a first cocatalyst compound is lowered, and when the concentration is more than 5 mmol/g, the catalyst component becomes inactive.

The total amount of the transition metal compound supported on the carrier may be 0.001 to 1 mmol based on 1 g of the carrier. When a ratio between the transition metal compound and the carrier satisfies the above range, appropriate supported catalyst activity is shown, which is advantageous in terms of the activity maintenance of a catalyst and economic feasibility.

The total amount of the cocatalyst compound supported on the carrier may be 2 to 15 mmol based on 1 g of the carrier. When the ratio of the cocatalyst compound and the carrier satisfies the above range, it is advantageous in terms of the activity maintenance of a catalyst and economic feasibility.

The carrier may be one or two or more. For example, both the transition metal compound and the cocatalyst compound may be supported on one carrier, and each of the transition metal compound and the cocatalyst compound may be supported on two or more carriers. In addition, only one of the transition metal compound and the cocatalyst compound may be supported on the carrier.

As a method for supporting the transition metal compound and/or the cocatalyst compound which may be used in the catalyst for olefin polymerization, a physical adsorption method or a chemical adsorption method may be used.

For example, the physical adsorption method may be a method of bringing a solution in which a transition metal compound is dissolved into contact with a carrier and then drying, a method of bringing a solution in which a transition metal compound and a cocatalyst compound are dissolved into contact with a carrier and then drying, a method of bringing a solution in which a transition metal compound is dissolved into contact with a carrier and then drying to prepare a carrier on which the transition metal compound is supported, separately bringing a solution in which a cocatalyst compound is dissolved into contact with a carrier and then drying to prepare a carrier on which the cocatalyst compound is supported, and then mixing them, or the like.

The chemical adsorption method may be a method of first supporting a cocatalyst compound on the surface of a carrier and then supporting a transition metal compound on the cocatalyst compound, a method of binding a functional group (for example, a hydroxyl group (—OH) on the surface of silica, in the case of silica) on the surface of a carrier and a catalyst compound covalently.

In a specific example of the present invention, the olefinic polymer may be a homopolymer of an olefinic monomer or a copolymer of olefinic monomer and comonomer. Preferably, the olefinic polymer is a copolymer of an olefinic monomer and an olefinic comonomer.

Herein, the olefinic monomer may be at least one selected from the group consisting of $C_{2-20}$ α-olefin, $C_{1-20}$ diolefin, $C_{3-20}$ cycloolefin, and $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, or 1-hexadecene, and the olefinic polymer may be a homopolymer including only one or a copolymer including two or more of the olefinic monomers exemplified above.

In an exemplary embodiment, the olefinic polymer may be a copolymer of ethylene and $C_{3-20}$ α-olefin. Preferably, the olefinic polymer may be a linear low-density polyethylene in which the olefinic monomer is ethylene and the olefinic comonomer is 1-hexene.

In this case, the content of ethylene is preferably 55 to 99.9 wt %, and more preferably 90 to 99.9 wt %. The content of the α-olefinic comonomer is preferably 0.1 to 45 wt %, and more preferably 0.1 to 10 wt %.

Method for Preparing Olefinic Polymer

According to an embodiment of the present invention, a method for preparing an olefinic polymer including: obtaining an olefinic polymer by polymerizing an olefinic monomer in the presence of a hybrid catalyst including: at least one first transition metal compound represented by the following Chemical Formula 1; and at least one second transition metal compound selected from a compound represented by the following Chemical Formula 2 and a compound represented by the following Chemical Formula 3, is provided:

[Chemical Formula 1]

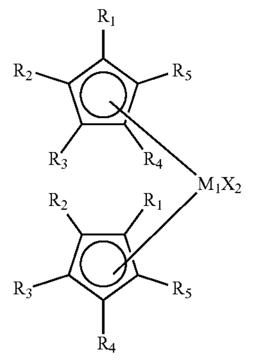

-continued

[Chemical Formula 2]

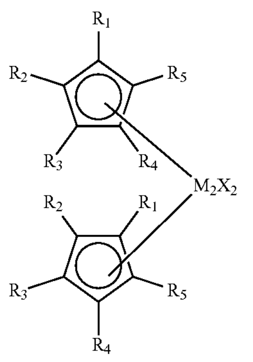

[Chemical Formula 3]

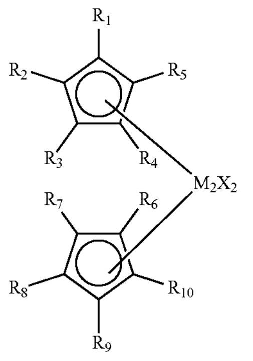

wherein $M_1$, $M_2$, X, and $R_1$ to $R_{10}$ are as defined above in the item of "olefinic polymer".

As described above, the olefinic polymer prepared by the preparation method according to an exemplary embodiment of the present invention has (1) the density of 0.9 to 0.95 g/cm$^3$; (2) the melt index ($I_{2.16}$) of 0.1 to 5.0 g/10 min as measured with a load of 2.16 kg at 190° C.; (3) the ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) the melt tension of 55 mN or more at a velocity at break of 350 mm/s; and (5) the maximum velocity at break of 550 mm/s or more.

In a specific example of the present invention, the olefinic polymer may have (1) the density of 0.915 to 0.945 g/cm$^3$; (2) the melt index ($I_{2.16}$) of 0.1 to 5.0 g/10 min as measured with a load of 2.16 kg at 190° C.; (3) the ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) the melt tension of 60 mN or more at a velocity at break of 350 mm/s; and (5) the maximum velocity at break of 570 mm/s or more.

In a preferred specific example of the present invention, the olefinic polymer may have (1) the density of the olefinic polymer of 0.915 to 0.942 g/cm$^3$; (2) the melt index ($I_{2.16}$) of 0.5 to 3.5 g/10 min as measured with a load of 2.16 kg at 190° C.; (3) the MFR of 20 to 50; (4) the melt tension of 60 to 100 mN at a velocity at break of 350 mm/s; and (5) the maximum velocity at break of 570 to 800 mm/s.

In a specific example of the present invention, the olefinic polymer may be polymerized by a polymerization reaction such as free radical, cationic, coordination, condensation, and addition polymerization, but is not limited thereto.

In an exemplary embodiment of the present invention, the olefinic polymer may be prepared by a gas phase polymerization method, a solution polymerization method, a slurry polymerization method, or the like. Preferably, the polymerization of the olefinic monomer may be performed by gas phase polymerization, specifically, the polymerization of the olefinic monomer may be performed in a gas phase fluidized bed reactor.

When the olefinic polymer is prepared by a solution polymerization method or a slurry polymerization method, an example of the solvent to be used may include a $C_{5-12}$ aliphatic hydrocarbon solvent such as pentane, hexane, heptane, nonane, decane, and isomers thereof; an aromatic hydrocarbon solvent such as toluene and benzene; a hydrocarbon solvent substituted with a chlorine atom such as dichloromethane and chlorobenzene; and a mixture thereof, but is not limited thereto.

BEST MODE FOR CARRYING OUT THE INVENTION

EXAMPLES

Hereinafter, the present disclosure will be specifically described through the following examples. However, the following examples are only illustrative of the present invention, and do not limit the scope of the present invention.

Preparation Example

The transition metal compound of Chemical Formula 1-1 (bis(n-propylcyclopentadienyl) hafnium dichloride) and the transition metal compound of Chemical Formula 2-1 (bis (n-butylcyclopentadienyl) zirconium dichloride) were purchased from TCI, and used without further purification.

892 g of a 10% toluene solution of methylaluminoxane was added to 4.47 g of the transition metal compound of Chemical Formula 1-1 and 1.67 g of the transition metal compound of Chemical Formula 2-1, and the solution was stirred at room temperature for 1 hour. The solution after the reaction was added to 200 g of silica (XPO-2402), 1.5 L of toluene was further added, and stirring was performed at 70° C. for 2 hours. The supported catalyst was washed with 500 mL of toluene, and was dried overnight at 60° C. under vacuum to obtain 280 g of a supported catalyst in powder form.

Examples 1-2

Ethylene/1-hexene copolymers were prepared in the presence of the supported catalysts, which were obtained in Preparation Example 1, using a gas phase fluidized bed reactor. The ethylene partial pressure of the reactor was maintained at about 15 kg/cm$^2$, and the polymerization temperature was maintained at 70-90° C.

The polymerization conditions of the examples are shown in the following Table 1.

TABLE 1

| | Example 1 | Example 2 |
|---|---|---|
| Polymerization temperature (° C.) | 75.4 | 80.9 |
| Catalyst injection amount (g/h) | 2.0 | 1.4 |
| Hydrogen injection amount (g/h) | 2.22 | 2.34 |
| 1-Hexene injection amount (kg/h) | 1.60 | 1.63 |
| Hydrogen/ethylene concentration (%) ratio | 0.047 | 0.048 |
| 1-Hexene/ethylene concentration (%) ratio | 2.096 | 1.993 |

Comparative Example 1

For comparison, DOWLEX 2045G (density: 0.9200 $g/cm^3$, melt index: 1.0 g/10 min) available from Dow was used.

Test Example

The physical properties of the olefinic polymer of the above examples were measured by the following methods and criteria. The results are shown in Table 2.

(1) Density

Measured according to ASTM D 1505.

(2) Melt Index and Melt Index Ratio (MFR)

The melt index was measured with a load of 21.6 kg and a load of 2.16 kg, respectively, at 190° C. in accordance with ASTM D 1238, and the ratio ($MI_{21.6}/MI_{2.16}$) was calculated.

(3) Melt Strength

A melt tension and a maximum velocity at break were measured with a capillary having a length of 30 mm, a diameter of 2 mm, and a shear rate of 72/s and/or a wheel having an initial velocity of 18 mm/s and an acceleration of 12 $mm/s^2$.

TABLE 2

| | Unit | Example 1 | Example 2 | Comparative Example 1 |
|---|---|---|---|---|
| $MI_{2.16}$ | g/10 min | 0.94 | 0.94 | 1.07 |
| $MI_{21.16}$ | g/10 min | 22.2 | 21.0 | 30.9 |
| MFR | — | 23.6 | 22.3 | 28.9 |
| Density | $g/cm^3$ | 0.9188 | 0.9200 | 0.9200 |
| Melt tension (350 mm/s) | mN | 61.6 | 62.3 | 51.8 |
| Maximum velocity at break | mm/s | 580 | 572 | 524 |

As confirmed from Table 2 and the FIGURE, the olefinic polymer according to the specific example of the present invention has excellent melt strength represented by melt tension and maximum velocity at break, and thus, has excellent bubble stability during blown film manufacture.

INDUSTRIAL APPLICABILITY

Accordingly, the present invention may provide an olefinic polymer having excellent melt strength.

The invention claimed is:

1. An olefinic polymer which has (1) a density of 0.9 to 0.95 $g/cm^3$; (2) a melt index ($I_{2.16}$) of 0.1 to 5.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) a melt tension of 55 mN or more at a velocity at break of 350 mm/s; and (5) a maximum velocity at break of 550 mm/s or more, wherein the olefin-based polymer is prepared by polymerizing an olefin-based monomer in the presence of a hybrid catalyst including: at least one first transition metal compound represented by the following Chemical Formula 1; at least one second transition metal compound selected from a compound represented by the following Chemical Formula 2; and at least one second transition metal compound selected from a compound represented by the following Chemical Formula 3, and the first transition metal compound is at least one of transition metal compounds represented by the following Chemical Formulae 1-1 and 1-2, and the second transition metal compound is a transition metal compound represented by the following Chemical Formula 2-1, and the catalyst further includes a carrier which supports the transition metal compound, and the carrier includes at least one selected from the group consisting of silica, alumina, and magnesia:

[Chemical Formula 1]

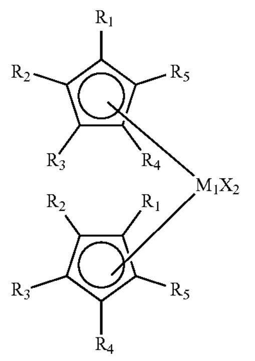

[Chemical Formula 2]

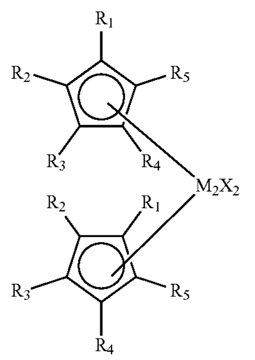

[Chemical Formula 3]

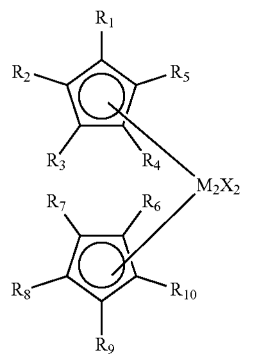

wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that $R_1$ to $R_{10}$ may be independently of each other connected to an adjacent group to form a substituted or unsubstituted saturated or unsaturated $C_{4-20}$ ring,

[Chemical Formula 1-1]

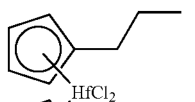

[Chemical Formula 1-2]

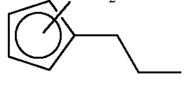

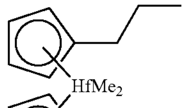

[Chemical Formula 2-1]

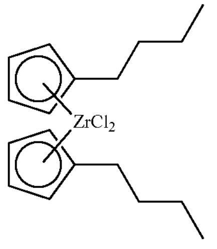

wherein Me is a methyl group.

2. The olefinic polymer of claim 1, wherein the olefinic polymer has (1) the density of 0.915 to 0.945 g/cm$^3$; (2) the melt index ($I_{2.16}$) of 0.1 to 5.0 g/10 min as measured with a load of 2.16 kg at 190° C.; (3) the ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) the melt tension of 60 mN or more at a velocity at break of 350 mm/s; and (5) the maximum velocity at break of 570 mm/s or more.

3. The olefinic polymer of claim 1, wherein a mole ratio of the first transition metal compound to the second transition metal compound is in a range of 100:1 to 1:100.

4. The olefinic polymer of claim 1, wherein the catalyst includes at least one cocatalyst compound selected from the group consisting of a compound represented by the following Chemical Formula 4, a compound represented by the following Chemical Formula 5, and a compound represented by the following Chemical Formula 6:

[Chemical Formula 4]

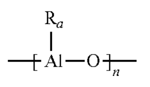

[Chemical Formula 5]

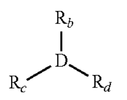

[Chemical Formula 6]

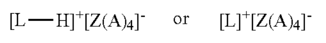

wherein n is an integer of 2 or more, $R_a$ is a halogen atom, a $C_{1-20}$ hydrocarbon group, or a $C_{1-20}$ hydrocarbon group substituted with halogen, D is aluminum (Al) or boron (B), and $R_b$, $R_c$, and $R_d$ are independently of one another a halogen atom, a $C_{1-20}$ hydrocarbon group, a $C_{1-20}$ hydrocarbon group substituted with halogen, or a $C_{1-20}$ alkoxy group, and L is a neutral or cationic Lewis base, $[L\text{-}H]^+$ and $[L]^+$ are a Bronsted acid, Z is a group 13 element, and A is independently of each other a substituted or unsubstituted $C_{6-20}$ aryl group or a substituted or unsubstituted $C_{1-20}$ alkyl group.

5. The olefinic polymer of claim 1, wherein a total amount of the hybrid transition metal compound supported on the carrier is 0.001 to 1 mmole based on 1 g of the carrier, and a total amount of the cocatalyst compound supported on the carrier is 2 to 15 mmole based on 1 g of the carrier.

6. The olefinic polymer of claim 1, wherein the olefinic polymer is a copolymer of the olefinic monomer and an olefinic comonomer.

7. The olefinic polymer of claim 6, wherein the olefinic monomer is ethylene, and the olefinic comonomer is one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

8. The olefinic polymer of claim 7, wherein the olefinic polymer is a linear low-density polyethylene in which the olefinic monomer is ethylene and the olefinic comonomer is 1-hexene.

9. A method for preparing an olefinic polymer, the method comprising: polymerizing an olefinic monomer by a gas phase polymerization in the presence of a hybrid catalyst including: at least one first transition metal compound represented by the following Chemical Formula 1; and at least one second transition metal compound selected from a compound represented by the following Chemical Formula 2 and a compound represented by the following Chemical Formula 3, thereby obtaining an olefinic polymer, wherein the olefinic polymer has (1) a density of 0.9 to 0.95 g/cm$^3$; (2) a melt index ($I_{2.16}$) of 0.1 to 5.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 or more; (4) a melt tension of 55 mN or more at a velocity at break of 350 mm/s; and (5) a maximum velocity at break of 550 mm/s or more, wherein the first transition metal compound is at least one of transition metal compounds represented by the following Chemical Formulae 1-1 and 1-2, and the second transition metal compound is a transition metal compound represented by the following Chemical Formula 2-1, and the catalyst further includes a carrier which supports the transition metal compound, and the carrier includes at least one selected from the group consisting of silica, alumina, and magnesia:

[Chemical Formula 1]

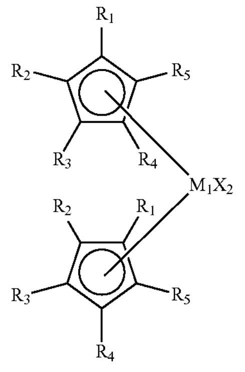

-continued

[Chemical Formula 2]

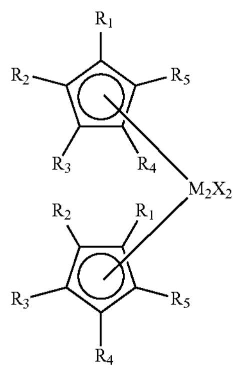

[Chemical Formula 3]

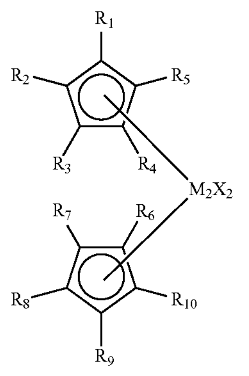

wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that $R_1$ to $R_{10}$ may be independently of each other connected to an adjacent group to form a substituted or unsubstituted saturated or unsaturated $C_{4-20}$ ring,

[Chemical Formula 1-1]

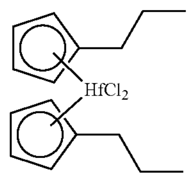

[Chemical Formula 1-2]

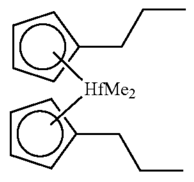

[Chemical Formula 2-1]

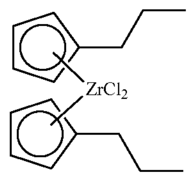

wherein Me is a methyl group.

* * * * *